(12) United States Patent
Yamori et al.

(10) Patent No.: US 10,757,421 B2
(45) Date of Patent: Aug. 25, 2020

(54) INFORMATION PROCESSING DEVICE, MOVING IMAGE CODING METHOD, AND RECORDING MEDIUM ON WHICH COMPUTER PROGRAM FOR MOVING IMAGE CODING IS RECORDED

(71) Applicant: FUJITSU LIMITED, Kawasaki-shi, Kanagawa (JP)

(72) Inventors: Akihiro Yamori, Kawasaki (JP); Satoshi Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/223,230

(22) Filed: Dec. 18, 2018

(65) Prior Publication Data

US 2019/0208216 A1 Jul. 4, 2019

(30) Foreign Application Priority Data

Jan. 4, 2018 (JP) .................. 2018-000291

(51) Int. Cl.
*H04N 19/167* (2014.01)
*H04N 19/119* (2014.01)
*H04N 19/172* (2014.01)
*H04N 19/124* (2014.01)
*H04N 5/225* (2006.01)
(Continued)

(52) U.S. Cl.
CPC ........... *H04N 19/167* (2014.11); *G06T 5/006* (2013.01); *H04N 5/2254* (2013.01); *H04N 19/115* (2014.11); *H04N 19/119* (2014.11); *H04N 19/124* (2014.11); *H04N 19/154* (2014.11); *H04N 19/17* (2014.11); *H04N 19/172* (2014.11); *H04N 19/176* (2014.11); *G06T 2207/10016* (2013.01)

(58) Field of Classification Search
CPC .. H04N 19/167; H04N 5/2254; H04N 19/124; H04N 19/172; H04N 19/119; H04N 19/17; H04N 19/176; H04N 19/154; H04N 19/115; G06T 5/006; G06T 2207/10016
See application file for complete search history.

(56) References Cited

U.S. PATENT DOCUMENTS

2003/0118100 A1* 6/2003 Honda .................. H04N 19/61
375/240.08
2003/0189730 A1* 10/2003 Enomoto ................ G06T 5/006
358/3.26
(Continued)

FOREIGN PATENT DOCUMENTS

JP 2010-239221 10/2010
WO 2016/140082 9/2016

*Primary Examiner* — Tracy Y. Li
(74) *Attorney, Agent, or Firm* — Fujitsu Patent Center

(57) ABSTRACT

An information processing device includes: a memory; and a processor coupled to the memory and configured to: calculate, for a first block included in a coding target picture included in moving image data, a ratio of an area of a corrected block obtained by correcting distortion of a subject represented in the first block to an area of the first block, set code amount control information for the first block such that the higher the ratio for the first block, the larger a code amount which is assigned to the first block, and code a second block belonging to the first block among a plurality of second blocks which is obtained by dividing the coding target picture according to the code amount control information for the first block.

15 Claims, 5 Drawing Sheets

(51) Int. Cl.
*G06T 5/00* (2006.01)
*H04N 19/154* (2014.01)
*H04N 19/17* (2014.01)
*H04N 19/176* (2014.01)
*H04N 19/115* (2014.01)

(56) References Cited

U.S. PATENT DOCUMENTS

| 2010/0189175 | A1* | 7/2010 | Fujii | H04N 19/126 |
| | | | | 375/240.03 |
| 2018/0007389 | A1 | 1/2018 | Izumi | |
| 2019/0108611 | A1* | 4/2019 | Izumi | G06T 3/0062 |

* cited by examiner

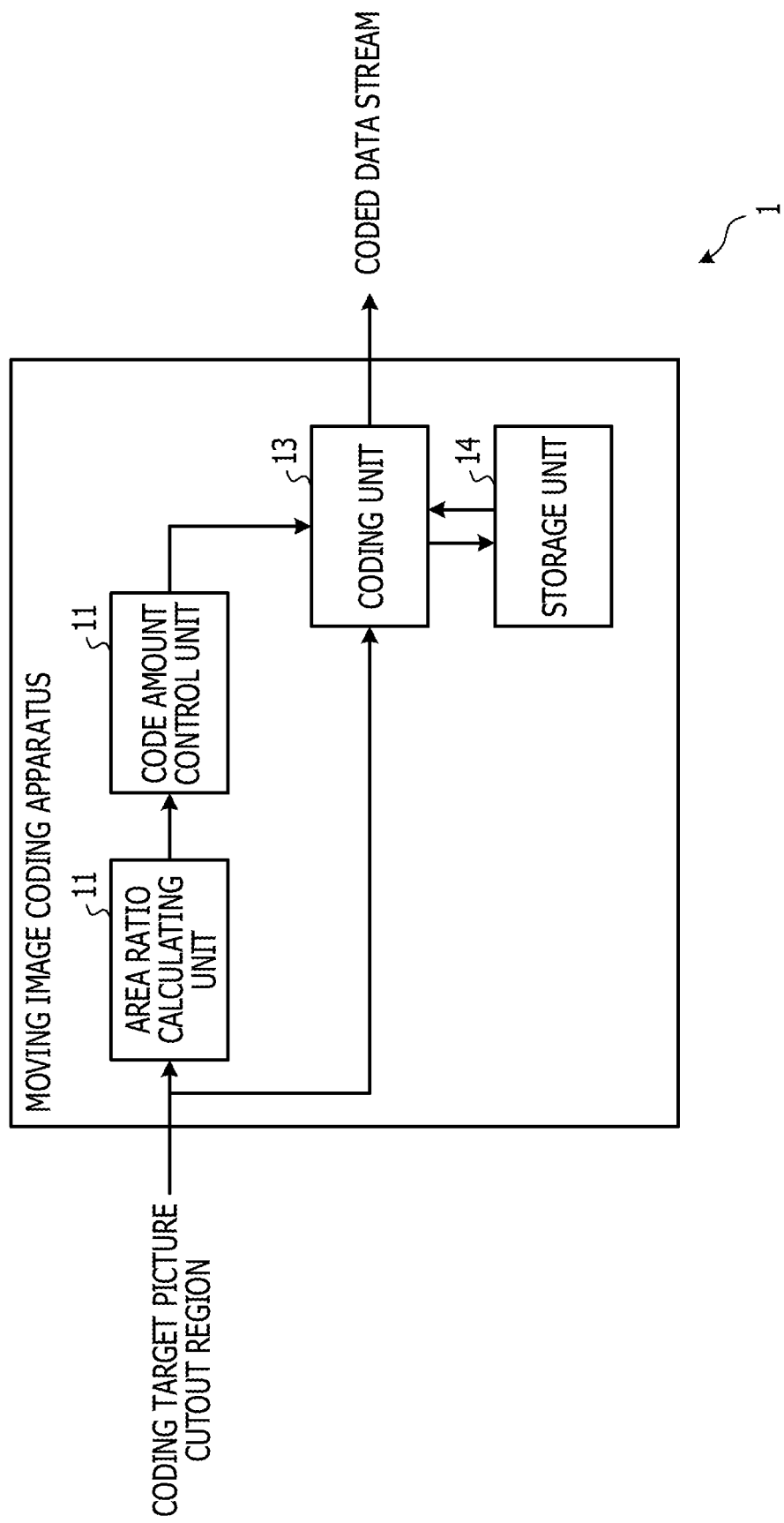

INFORMATION PROCESSING DEVICE, MOVING IMAGE CODING METHOD, AND RECORDING MEDIUM ON WHICH COMPUTER PROGRAM FOR MOVING IMAGE CODING IS RECORDED

CROSS-REFERENCE TO RELATED APPLICATION

This application is based upon and claims the benefit of priority of the prior Japanese Patent Application No. 2018-291, filed on Jan. 4, 2018, the entire contents of which are incorporated herein by reference.

FIELD

The embodiments discussed herein are related to an information processing device, a moving image coding method, and a recording medium on which a computer program for moving image coding is recorded.

BACKGROUND

Moving image data includes a very large amount of data. Therefore, when a device handling the moving image data is to transmit the moving image data to another device, or when the device is to store the moving image data in a storage device, the device compresses the moving image data by coding the moving image data. Advanced Video Coding (MPEG-4 AVC|ITU-T H.264) and High Efficiency Video Coding (HEVC|ITU-T H.265) are established as typical moving image coding standards.

A related technology is disclosed in Japanese Laid-open Patent Publication No. 2010-239221.

SUMMARY

According to an aspect of the embodiments, an information processing device includes: a memory; and a processor coupled to the memory and configured to: calculate, for a first block included in a coding target picture included in moving image data, a ratio of an area of a corrected block obtained by correcting distortion of a subject represented in the first block to an area of the first block, set code amount control information for the first block such that the higher the ratio for the first block, the larger a code amount which is assigned to the first block, and code a second block belonging to the first block among a plurality of second blocks which is obtained by dividing the coding target picture according to the code amount control information for the first block.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a schematic block diagram of a moving image coding apparatus according to one embodiment;

DESCRIPTION OF EMBODIMENTS

Figure 2A:
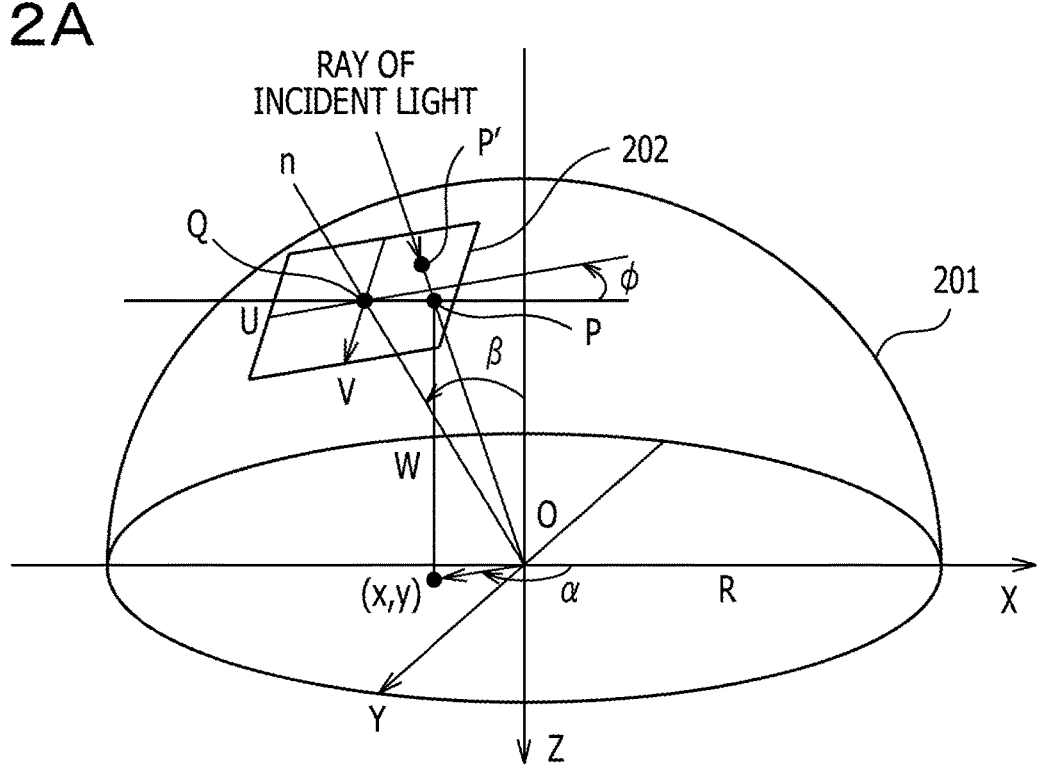
FIG. 2A and FIG. 2B illustrate an example of image correction processing.

As an example, a coding target picture is divided into a plurality of blocks. For each coding target block, a prediction block is generated from another picture that is already coded or an already coded region of the coding target picture. A compression of an amount of information is achieved by quantizing orthogonal transform coefficients obtained by performing an orthogonal transform of a prediction error signal between the coding target block and the prediction block.

In a case where moving image data is obtained by using a wide-angle lens such as a fisheye lens, a subject represented in each picture included in the moving image data may be distorted greatly due to a distortion aberration caused by the wide-angle lens or the like. As an example, in order to reduce a degradation in image quality of the picture in which such a distortion is corrected, a code amount is assigned to each coding block according to a distance from a photographing center to each coding block within a region of interest.

With only the distance between a position corresponding to the photographing center in the picture and the coding target block, for example, a degree of distortion of the subject in the picture may not be evaluated sufficiently. For example, the code amount assigned to the coding target block may not necessarily be appropriate. Therefore, the image quality of the picture in which the distortion of the subject is corrected may be varied depending on the position in the picture.

As an example, a moving image coding apparatus may be provided which suppresses a variation in image quality, the variation corresponding to a position in a picture included in moving image data, when the distortion of a subject in the picture is corrected.

A moving image coding apparatus according to one embodiment will be described in the following with reference to the drawings. This moving image coding apparatus codes, as a plane image, moving image data obtained by a camera that causes a distortion of a subject due to a distortion aberration or the like to occur in a picture, the camera being, for example, an omnidirectional camera using a fisheye lens as an imaging optical system. At this time, for each of a plurality of blocks obtained by dividing the picture, the moving image coding apparatus controls a code amount to be assigned to the block according to a ratio between the area of the block and the area of a corrected block obtained by correcting the distortion of the subject represented in the block.

Incidentally, the picture may be either a frame or a field. A frame is one still image in the moving image data. On the other hand, a field is a still image obtained by extracting only the data of odd-numbered rows or the data of even-numbered rows from a frame.

In addition, suppose in the present embodiment that the moving image coding apparatus codes the moving image data in compliance with one of various coding standards that divide each picture included in moving image data into a plurality of blocks and perform coding in each block. Incidentally, such a coding standard may be, for example, Advanced Video Coding (MPEG-4 AVC|ITU-T H.264) or High Efficiency Video Coding (HEVC|ITU-T H.265).

FIG. 1 is a schematic block diagram of a moving image coding apparatus according to one embodiment. A moving image coding apparatus 1 includes an area ratio calculating unit 11, a code amount control unit 12, a coding unit 13, and a storage unit 14. These units possessed by the moving image coding apparatus 1 are each implemented as a discrete circuit in the moving image coding apparatus 1. Alternatively, these units possessed by the moving image coding apparatus 1 may be implemented in the moving image coding apparatus 1 as one or a plurality of integrated circuits in which circuits implementing functions of the parts are integrated. Alternatively, these units possessed by the moving image coding apparatus 1 may be a function module implemented by a computer program executed on a processor possessed by the moving image coding apparatus 1.

For each of a plurality of blocks obtained by dividing a coding target picture included in moving image data, the area ratio calculating unit 11 calculates a ratio of the area of a corrected block to the area of the block. Incidentally, each block (first block) may, for example, be set as a block serving as a unit of code amount control. For example, each block may be set as a macroblock in moving picture experts group-4 (MPEG-4) or MPEG-4 AVC or a coding tree unit (CTU) or a quantization group in HEVC. Alternatively, each block may include a plurality of macroblocks, CTUs, or quantization groups.

For this purpose, the area ratio calculating unit 11 obtains a corrected block corresponding to each block. Accordingly, description will first be made of image correction processing for obtaining the corrected block.

Figure 2B:
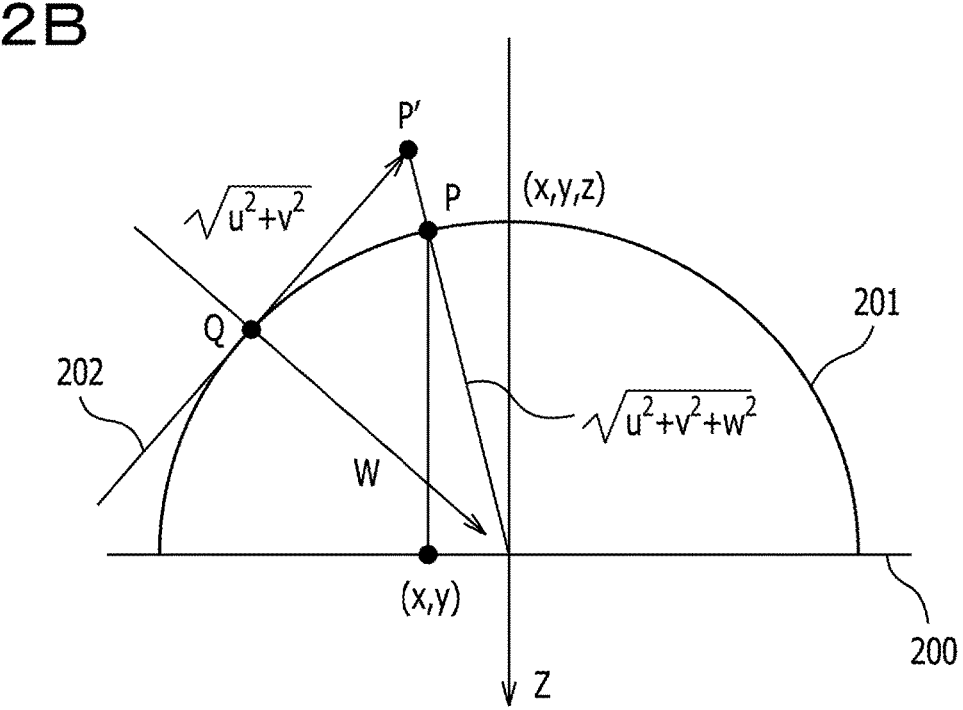

FIG. 2A and FIG. 2B illustrate an example of an image correction processing. A picture obtained by photographing a subject by using a fisheye lens as an imaging optical system is, for example, corrected by using projective transformation that projects each point on an imaginary spherical surface representing a space corresponding to an imaging plane onto a plane tangent to the spherical surface. As illustrated in FIG. 2A and FIG. 2B, suppose that the imaging plane 200 is represented by an XY plane. A Z-axis represents the optical axis direction of the fisheye lens. An origin O as a center of the imaging plane 200 represents a point of intersection of the optical axis of the fisheye lens and the imaging plane 200. An imaging range of the fisheye lens in a picture is assumed to correspond to the imaginary spherical surface 201. Here, consideration will be given to generation of a corrected image in which distortion of the subject is corrected by correcting the picture obtained by the fisheye lens such that a line of sight directed from the origin O to an arbitrary point Q on the imaginary spherical surface 201 is set as a center. In this case, the correction of the image is expressed by a coordinate transformation between a UVW orthogonal coordinate system, in which a plane tangent to the imaginary spherical surface 201 at the point Q is set as a UV plane 202 and a normal direction of the UV plane 202 is set as a W-axis, and a XYW orthogonal coordinate system, and projective transformation of a point on the imaginary spherical surface 201 onto the UV plane 202.

Suppose that a ray of incident light passing through a point P' on the UV plane 202 (coordinates (u, v, 0) in the UVW orthogonal coordinate system) and going to the origin O intersects the imaginary spherical surface 201 at a point P. In this case, supposing that the coordinates of the point P in an XYZ orthogonal coordinate system are (x, y, z), the point P corresponds to a pixel expressed by a point (x, y, 0) in the XY plane, the pixel being in the image obtained by the fisheye lens. Here, letting R be the radius of the imaginary spherical surface 201, for example, a distance from a pixel corresponding to the optical axis of the fisheye lens in the picture to a pixel corresponding to the outer edge of the imaging range of the fisheye lens, $z=\{R^2-(x^2+y^2)\}^{1/2}$. In the UVW orthogonal coordinate system, the coordinates of the origin O are (0, 0, w). Thus, from the relation of a right triangle, the following equation holds.

$$|OP'|^2=|QP'|^2+|QO|^2=(u^2+v^2)+w^2 \quad (1)$$

Because $OP'/OP=(u^2+v^2+w^2)^{1/2}/R$, a coordinate value P' (x', y', z') of the point P' in the XYZ orthogonal coordinate system is expressed by the following equation.

$$\begin{pmatrix} x' \\ y' \\ z' \end{pmatrix} = \frac{\sqrt{u^2+v^2+w^2}}{R} \begin{pmatrix} x \\ y \\ z \end{pmatrix} \quad (2)$$

Hence, it is understood that the coordinates of the point on the imaginary spherical surface 201 and the coordinates of the point on the UV plane 202 corresponding to the imaging plane after correction may be calculated from the coordinates of the point on the imaging plane 200.

Suppose that in the XYZ orthogonal coordinate system, the UV plane 202 is rotated by a rotational angle α about the z axis, is inclined by an inclination angle β with respect to the z-axis, and is rotated by a rotational angle φ about the W axis. Further, letting m be a magnification of an image corresponding to the UV plane 202, the image being obtained by the correction, w=mR. Hence, from the above Equation (2), the following equation holds between the coordinate value (u, v) of the point P' on the UV plane 202 in the UVW orthogonal coordinate system and the corresponding coordinates (x, y) on the imaging plane 200.

$$x = \frac{R[uA - vB + mR\sin\beta\sin\alpha]}{\sqrt{u^2+v^2+(mR)^2}} \quad (3)$$

$$y = \frac{R[uC - vD - mR\sin\beta\cos\alpha]}{\sqrt{u^2+v^2+(mR)^2}}$$

$$A = \cos\phi\cos\alpha - \sin\phi\sin\alpha\cos\beta$$

$$B = \sin\phi\cos\alpha + \cos\phi\sin\alpha\cos\beta$$

$$C = \cos\phi\sin\alpha + \sin\phi\cos\alpha\cos\beta$$

$$D = \sin\phi\sin\alpha - \cos\phi\cos\alpha\cos\beta$$

Figure 3:
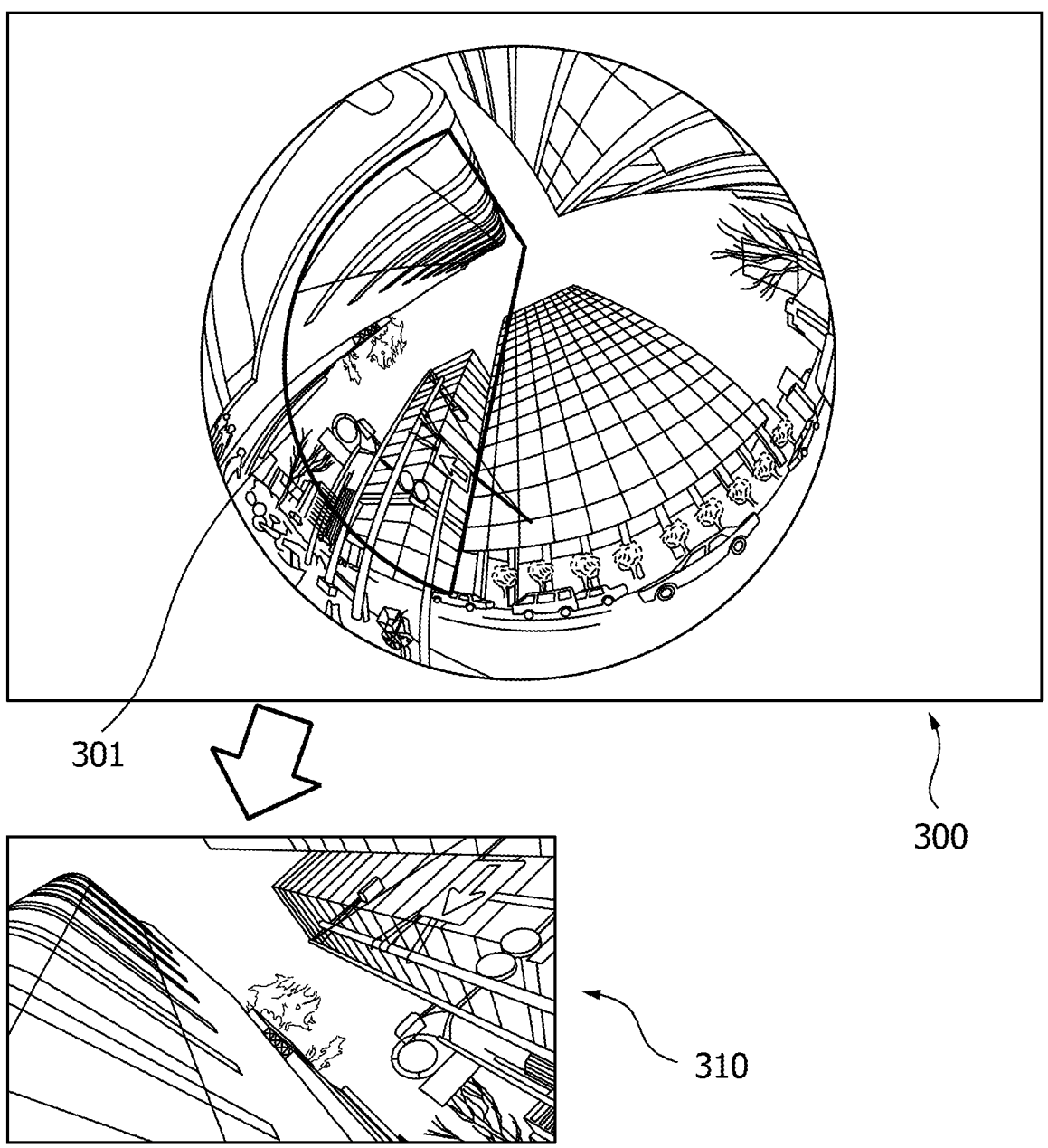
FIG. 3 is a diagram illustrating an example of a coding target picture and a corrected image obtained by correcting distortion of a subject in a region cut out from the coding target picture.

FIG. 3 is a diagram illustrating an example of a coding target picture and a corrected image obtained by correcting a distortion of a subject in a region cut out from the coding target picture. A subject is distorted in a coding target picture 300 obtained by photographing the subject by using the fisheye lens. However, the distortion of the subject is corrected by projecting each pixel included in a cutout region 301 of interest in the coding target picture 300 onto a corrected image 310 as a plane according to Equation (3). Incidentally, when the corrected image 310 is generated, it suffices to obtain, for each pixel of the corrected image 310, the position of a corresponding pixel in the coding target picture 300 according to Equation (3). In a case where the corresponding pixel straddles a plurality of pixels in the coding target picture (for example, in a case where the coordinate value of the corresponding pixel is not an integer), it suffices to calculate the value of the pixel in the corrected image 310 by interpolation using the values of the plurality of pixels.

The area ratio calculating unit 11 obtains a corrected block corresponding to a block of interest by obtaining the position of a pixel in the corrected image for each pixel within the block of interest according to Equation (3). At this time, it suffices to set the rotational angle α, the inclination angle β, and the rotational angle φ in advance according to the position of the block within the picture. For example, it suffices to set, for each block, a cutout region from the picture, the cutout region including the block, in advance, and set the rotational angle α, the inclination angle β, and the rotational angle φ while a center of the corrected image corresponding to the cutout region (the center corresponds to the point of tangency Q between the imaginary spherical surface and the UV plane in FIG. 2) is set as a reference point. Incidentally, as illustrated in FIG. 3, the cutout region is a region corresponding to the corrected image in which distortion of the subject is corrected. The magnification m is set according to a ratio between the size of the cutout region in the coding target picture and the size of the corrected image. For example, in a case where the subject in the coding target picture has no distortion, the magnification m is set at 1 when the corrected image is generated such that the size of the cutout region and the size of the corrected image are equal to each other.

In the present embodiment, the corrected block has a shape distorted according to the position of the corresponding block in the coding target picture as well as the rotational angle α, the inclination angle β, and the rotational angle φ. Accordingly, the area ratio calculating unit 11, for example, calculates the area of a rectangle circumscribing the corrected block as the area of the corrected block. Alternatively, the area ratio calculating unit 11 may approximate the corrected block by a figure having another shape, for example, an arcuate figure or a sector, and calculate the area of the approximate figure as the area of the corrected block.

Alternatively, the area ratio calculating unit 11 may calculate the coordinates of four corners of the corrected block in the corrected image by applying Equation (3) to each of four corners of the block of interest. The area ratio calculating unit 11 may calculate the area of a region enclosed by a straight line coupling two adjacent corners to each other among the four corners of the corrected block as the area of the corrected block.

The area ratio calculating unit 11 calculates, for each block of the coding target picture, a ratio of the area of the corrected block to the area of the block (which ratio will hereinafter be referred to simply as an area ratio). For each block of the coding target picture, the area ratio calculating unit 11 notifies the area ratio of the block to the code amount control unit 12.

For each block of the coding target picture, the code amount control unit 12 controls the code amount of the block according to the area ratio of the block. In the present embodiment, the code amount control unit 12 sets code amount control information of each block such that the higher the area ratio of the block, the larger the code amount assigned to the block. For example, the code amount control unit 12 reduces the quantization scale of the block as the area ratio of the block is increased. Alternatively, for each block, the code amount control unit 12 may set the quantization scale of the block such that the quantization scale in a case where the area ratio is equal to or higher than a given reference value is smaller than the quantization scale in a case where the area ratio is lower than the given reference value. The given reference value may be, for example, the magnification m of the corrected image. The code amount control unit 12, for example, sets the quantization scale such that the quantization scale becomes a value obtained by dividing the quantization scale corresponding to the given reference value by a ratio of the area ratio to the given reference value. The quantization scale is an example of the code amount control information.

Alternatively, for each block, the code amount control unit 12 may set a quantization parameter of the block such that the quantization scale is set as described above. The quantization parameter is a parameter for defining the quantization scale, and is, for example, a QP value in H.264 or H.265 (HEVC). The quantization parameter is another example of the code amount control information. For example, in H.264 and H.265, each time the QP value is increased by 6, the quantization scale is doubled, for example, the code amount becomes ½. Conversely, each time the QP value is decreased by 6, the quantization scale becomes ½, for example, the code amount is doubled. Accordingly, for each block, it suffices for the code amount control unit 12 to decrease the QP value by 6 each time the area ratio of the block is doubled. For example, it suffices for the code amount control unit 12 to set the QP value according to the following equation.

$$\text{new}Q = Q\text{ref} - 6 * \log_2(r/m) \text{ if } r/m > 1$$

$$\text{new}Q = Q\text{ref} + 6 * \log_2(r/m) \text{ else} \quad (4)$$

where r is the area ratio, Qref is the QP value corresponding to the magnification m of the corrected image, and newQ is the QP value to be set.

Thus, when the number of pixels included in the corrected block is larger than m times the number of pixels included in the block in the coding target picture, the code amount control unit 12 may increase the code amount assigned to the block. Hence, a degradation in image quality as a result of coding the block in the coding target picture is suppressed more as the area of the corresponding corrected block is increased. As a result, a degradation in image quality of the corrected image is suppressed.

For each block of the coding target picture, the code amount control unit 12 notifies the coding unit 13 of the code amount control information assigned to the block, for example, the quantization parameter set for the block.

The coding unit 13 codes the coding target picture. For example, the coding unit 13 divides the coding target block into a plurality of coding unit blocks, and calculates, as a prediction error signal, difference values between corresponding pixels of each coding unit block and a prediction block for the coding unit block. Incidentally, the coding unit block (second block) may be identical to a block as a code amount control unit. Alternatively, the coding unit 13 may divide the coding target picture such that one or a plurality of coding unit blocks are included in a block as a code amount control unit. The coding unit 13 codes each coding unit block according to the code amount control information for a block as a code amount control unit to which block the coding unit block belongs.

Accordingly, for each coding unit block, the coding unit 13, for example, generates the prediction block so as to minimize a coding cost as an estimated value of the code amount. For example, in a case where the coding target picture is an I-picture to which an intra-predictive coding mode is applied, the coding unit 13 generates the prediction block for the coding unit block based on the values of already coded pixels surrounding the coding unit block, the values being stored in the storage unit 14.

Suppose, on the other hand, that the coding target picture is a P-picture or a B-picture to which an inter-predictive coding mode is applicable in addition to the intra-predictive coding mode. In this case, for each coding unit block, the coding unit 13 performs a motion search between the coding unit block and an already coded picture (referred to as a local decoded picture) stored in the storage unit 14, for example. The coding unit 13 identifies a region in the already coded picture in which region a difference from the coding unit block is at a minimum, performs motion compensation for the identified region, and thereby obtains the prediction block in the case where the inter-predictive coding mode is applied. Further, the coding unit 13 obtains the prediction block in the case where the intra-predictive coding mode is applied based on the values of already coded pixels surrounding the coding unit block. The coding unit 13 uses, from those prediction blocks, the prediction block that minimizes the code amount, to generate the prediction error signal.

The coding unit 13 obtains orthogonal transform coefficients by performing an orthogonal transform of the prediction error signal of each coding unit block. The coding unit 13 quantizes orthogonal transform coefficients according to the code amount control information for a block as a code amount control unit, the block including the coding unit block. For example, the coding unit 13 quantizes the orthogonal transform coefficients by the quantization scale defined by the quantization parameter set for the block as a code amount control unit, the block including the coding unit block. Thus, the larger the area ratio of the block as a code amount control unit, the smaller the quantization scale. As a result, a degradation in image quality due to quantization is suppressed.

The coding unit 13 entropy-codes the quantized orthogonal transform coefficients. The coding unit 13 may further entropy-code information used to generate the prediction block, for example, a motion vector for motion compensation. The coding unit 13 outputs the coded data of the coding target picture.

Further, the coded coding unit block may be referred to by a coding unit block yet to be coded in the coding target picture or a picture subsequent to the coding target picture in coding order. Accordingly, the coding unit 13 reproduces the values of pixels of each coding unit block from the quantized orthogonal transform coefficients of each coding unit block. For this purpose, the coding unit 13 reproduces orthogonal transform coefficients by dequantizing the quantized orthogonal transform coefficients of each coding unit block. The coding unit 13 reproduces the prediction error signal of each coding unit block by performing an inverse orthogonal transform of the reproduced orthogonal transform coefficients of each coding unit block, adds the prediction error signal to the values of respective pixels of a corresponding prediction block, and thereby reproduces the pixel values of each coding unit block. The whole of the coding target picture is reproduced by reproducing the pixel values of all of the coding unit blocks of the coding target picture. The coding unit 13 writes the reproduced coding target picture as a local decoded picture to the storage unit 14.

The storage unit 14 stores the local decoded picture once coded and then decoded by the coding unit 13 and the like. The storage unit 14 outputs the local decoded picture to the coding unit 13.

Figure 4:
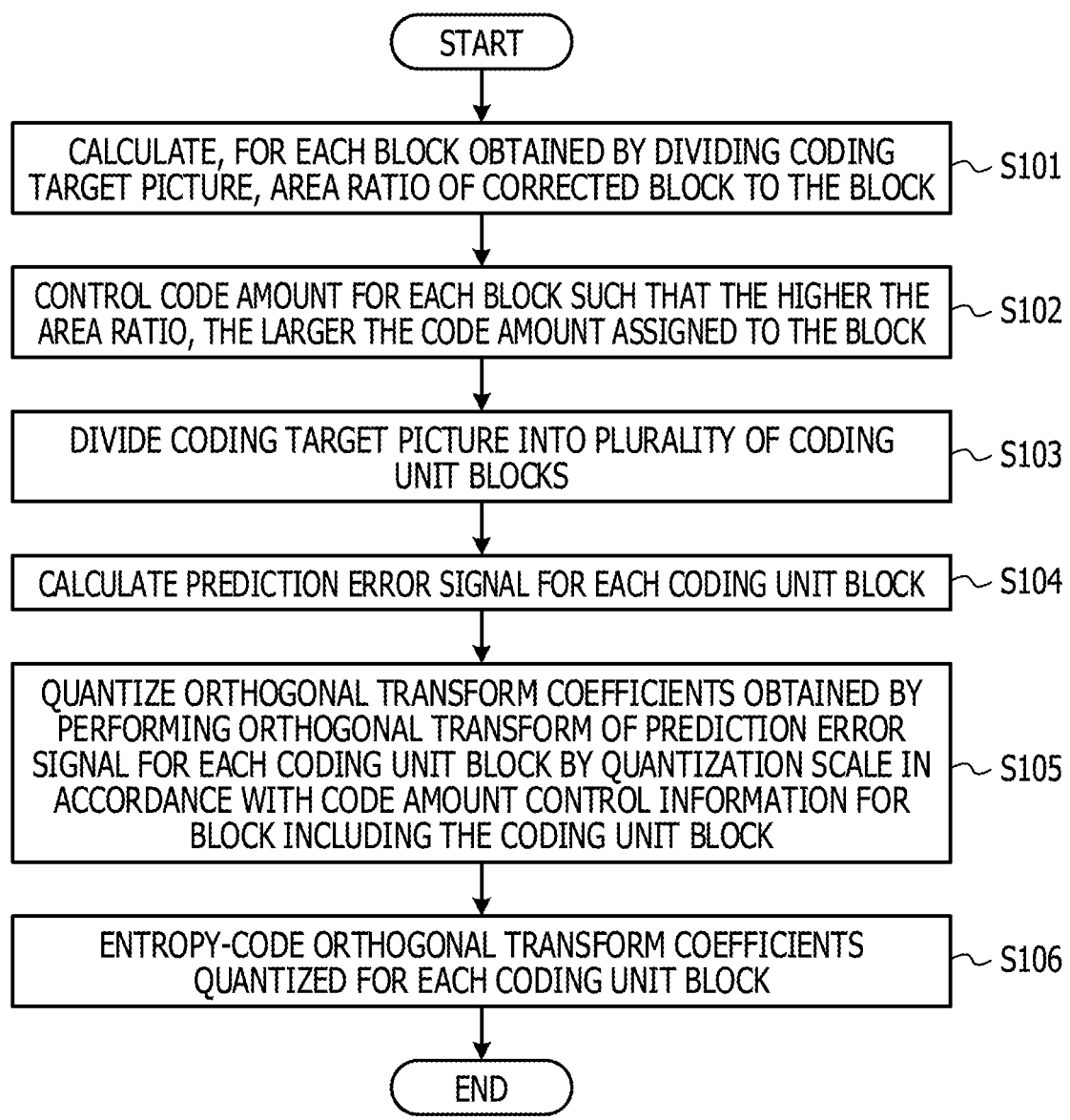
FIG. 4 is a flowchart of operation of moving image coding processing.

FIG. 4 is a flowchart of operation of moving image coding processing performed by a moving image coding apparatus. The moving image coding apparatus illustrated by reference to FIG. 4 may be the moving image coding apparatus 1 depicted in FIG. 1. The moving image coding apparatus 1 performs the moving image coding processing according to the operation flowchart illustrated in the following for each coding target picture.

The area ratio calculating unit 11 calculates an area ratio for each of a plurality of blocks obtained by dividing the coding target picture, the area ratio being a ratio of the area of a corrected block in which distortion of the subject is corrected to the area of the block (step S101). The area ratio calculating unit 11 notifies the area ratio of each block to the code amount control unit 12.

The code amount control unit 12 controls, for each block, the code amount of the block such that the higher the area ratio of the block, the larger the code amount assigned to the block (step S102). The code amount control unit 12 notifies code amount control information for each block to the coding unit 13.

The coding unit 13 divides the coding target picture into a plurality of coding unit blocks (step S103). The coding unit 13 generates a prediction block for each of the coding unit blocks, and calculates a prediction error signal between the coding unit block and the prediction block (step S104). The coding unit 13 calculates, for each coding unit block, orthogonal transform coefficients by performing an orthogonal transform of the prediction error signal. The coding unit 13 quantizes the orthogonal transform coefficients calculated for each coding unit block by the quantization scale in accordance with the code amount control information for a block including the coding unit block (step S105). Further, the coding unit 13 generates a coded data stream by entropy-coding the orthogonal transform coefficients quantized for each coding unit block (step S106). The moving image coding apparatus 1 ends the moving image coding processing.

As described above, the moving image coding apparatus divides a coding target picture included in moving image data obtained by photographing a subject using a fisheye lens into a plurality of blocks. The moving image coding apparatus controls a code amount for each block such that the higher the ratio of the area of a corrected block obtained by correcting distortion of the subject in the block to the area of the block, the larger the code amount assigned to the block. Therefore, the more the number of pixels in a block increases when the distortion of the subject is corrected, the more the moving image coding apparatus may suppress a degradation in image quality due to coding. As a result, the moving image coding apparatus may suppress a variation in image quality at a time of correcting the distortion of the subject in the coding target picture, the variation depending on a position in the coding target picture.

Incidentally, according to a modification, for one or more of the plurality of blocks obtained by dividing the coding target picture, a plurality of cutout regions including the block(s) may be set. The rotational angle $\alpha$, the inclination angle $\beta$, and the rotational angle $\varphi$ may be set for each cutout range. In this case, for a block included in a plurality of cutout regions, the area ratio calculating unit 11 may calculate an area ratio for each cutout region, and notify a maximum value of the calculated area ratios to the code amount control unit 12. Thus, even when a corrected image is generated according to any of the plurality of cutout regions assumed in advance, the code amount control unit 12 may suppress a degradation in image quality due to the coding of the block included in the plurality of cutout regions. As a result, the moving image coding apparatus may suppress a degradation in image quality of the corrected image.

Alternatively, one or more of the plurality of blocks obtained by dividing the coding target picture may not be included in any cutout region. In this case, the code amount control unit 12 may control the code amount of each block such that the code amount assigned to a block not included in any cutout region is smaller than a block included in some cutout region. The area ratio calculating unit 11 does not need to calculate the area ratio of the block not included in any cutout region.

According to another modification, for each of the plurality of blocks obtained by dividing the coding target picture, the area ratio calculating unit 11 may set one of pixels included in the block as a reference point, set a point on the imaginary spherical surface in FIG. 2, the point corresponding to the reference point, as the point Q, and set the rotational angle $\alpha$ and the inclination angle $\beta$. This corresponds to setting the reference point of a cutout region described above within the block. Incidentally, the reference point may, for example, be a pixel at the center of the block or a pixel in the block which pixel is closest to a pixel corresponding to the optical axis. The area ratio calculating unit 11 may calculate an area ratio for each block by obtaining a corrected block based on the set rotational angle $\alpha$ and the set inclination angle $\beta$. Incidentally, it suffices to set the rotational angle $\varphi$ to an arbitrary angle, for example, 0°. According to the present modification, even when no cutout region is set for the coding target picture, the moving image coding apparatus may control the code amount of each block so as to suppress a variation in image quality, the variation depending on a position in the picture, at a time of correcting distortion of the subject in the coding target picture.

In the foregoing embodiment or the modifications, the imaging optical system used when moving image data is generated is assumed to be a fisheye lens used in an omnidirectional camera or the like. However, the imaging optical system used when moving image data is generated in the foregoing embodiment or the modifications may be a lens that causes a distortion aberration other than the fisheye lens. In this case, as an example, the storage unit 14 may store a reference table indicating, for each pixel in the coding target picture, the position of a corresponding pixel in the corrected image when distortion of the subject is corrected. The area ratio calculating unit 11 may obtain a corrected block with respect to a block of interest by referring to the reference table, and calculate an area ratio based on the obtained corrected block. Incidentally, relation between the position of each pixel in the coding target picture and the position of the corresponding pixel in the corrected image is obtained according to characteristics of the imaging optical system.

The moving image coding apparatus according to the foregoing embodiment or a modification thereof is used for various applications. For example, the moving image coding apparatus is incorporated in a video transmitting device, a videophone system, a computer, a mobile telephone, or the like.

Figure 5:
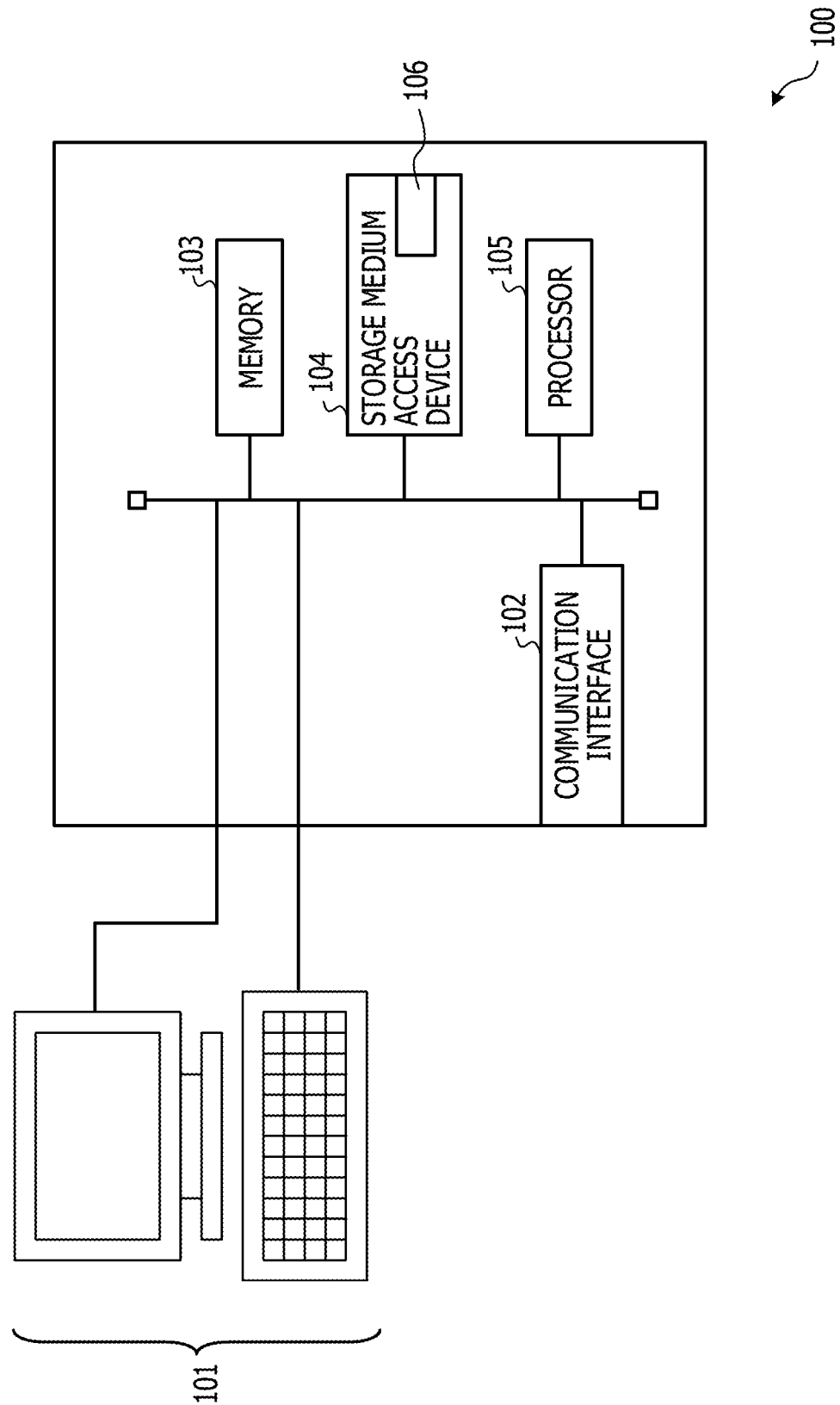
FIG. 5 is a block diagram of a computer that operates as a moving image coding apparatus when a computer program operates which implements functions of each part of the moving image coding apparatus according to the embodiment or a modification thereof.

FIG. 5 is a block diagram of a computer that operates as a moving image coding apparatus according to the foregoing embodiment or a modification thereof when a computer program that implements functions of each part of the moving image coding apparatus operates.

A computer 100 includes a user interface 101, a communication interface 102, a memory 103, a storage medium access device 104, and a processor 105. The processor 105 is coupled to the user interface 101, the communication interface 102, the memory 103, and the storage medium access device 104 via a bus, for example.

The user interface 101, for example, includes an input device such as a keyboard and a mouse or the like and a display device such as a liquid crystal display or the like. Alternatively, the user interface 101 may include a device in which an input device and a display device are integrated with each other, such as a touch panel display or the like. In response to a user operation, for example, the user interface 101 outputs an operating signal selecting moving image data to be coded to the processor 105.

The communication interface 102 may include a communication interface and a control circuit therefor for coupling the computer 100 to a device that generates moving image data, for example a video camera. Such a communication interface may, for example, be a universal serial bus (USB).

Further, the communication interface 102 may include a communication interface and a control circuit therefor for connection to a communication network complying with a communication standard such as Ethernet (registered trademark) or the like.

In this case, the communication interface 102 obtains moving image data to be coded from another apparatus coupled to the communication network, and transfers the moving image data to the processor 105. The communication interface 102 may output coded moving image data received from the processor 105 to the other apparatus via the communication network.

The memory 103, for example, includes a readable and writable semiconductor memory and a read-only semiconductor memory. The memory 103 stores a computer program for performing the moving image coding processing, the computer program being executed on the processor 105, and data generated in the middle of or as a result of the moving image coding processing.

The storage medium access device 104 is, for example, a device that accesses a storage medium 106 such as a magnetic disk, a semiconductor memory card, an optical storage medium. The storage medium access device 104, for example, reads the computer program for the moving image coding processing, the computer program being stored on the storage medium 106 and to be executed on the processor 105, and transfers the computer program to the processor 105.

The processor 105, for example, includes at least one central processing unit (CPU). The processor 105 may further include a numerical processor. The processor 105 generates coded moving image data by executing the computer program for the moving image coding processing according to the foregoing embodiment or a modification. The processor 105 stores the generated coded moving image data in the memory 103, or outputs the generated coded moving image data to another apparatus via the communication interface 102.

Incidentally, the computer program that may perform functions of each part of the moving image coding apparatus 1 on the processor may be provided in a form of being recorded on a medium readable by a computer. However, such recording media do not include carrier waves.

All examples and specific terms included herein are intended for an instructive purpose of helping a reader understand the present technology and a concept contributed by the present inventor for the promotion of the pertinent technology, and are to be construed as not being limited to the configuration of any example in the present specification, such a specific cited example, and such a specific cited condition that are related to indication of superiority and inferiority of the present technology. While embodiments of the present technology are described in detail, it is to be understood that various changes, substitutions, and alterations may be made thereto without departing from the spirit and scope of the present technology.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
    a memory; and
    a processor coupled to the memory and configured to:
       calculate, for each of first blocks which are obtained by dividing a coding target picture included in moving image data, a ratio of an area of respective corrected blocks which is obtained by correcting distortion of a subject represented in the respective first blocks to an area of the respective first blocks,
       generate code amount control information to control a code amount of each of the first blocks, such that the higher the ratio for the respective first blocks and the higher a data amount of the respective corrected blocks, the larger a code amount which is assigned to the respective first blocks,
       divide the coding target picture into second blocks,
       generate a prediction block for each of the second blocks,
       calculate a prediction error signal between the respective second blocks and the corresponding prediction block,
       calculate a orthogonal transform coefficient for each of the second blocks by performing an orthogonal transform of the corresponding prediction error signal,
       quantize the orthogonal transform coefficient by a quantization scale in accordance with the code amount control information of the respective first blocks including the respective second blocks, and
       generate a coded data stream by entropy-coding the orthogonal transform coefficient which is quantized for each of the second blocks.

2. The information processing device according to claim 1, wherein the moving image data is generated by photographing using a fisheye lens.

3. The information processing device according to claim 2, wherein the processor is configured to:
    obtain the corrected block by projecting the respective first blocks onto a plane tangent to an imaginary spherical surface at a point on the imaginary spherical surface, the point corresponding to a reference point within a given region including the respective first blocks, the imaginary spherical surface having, as a radius, a distance from a pixel corresponding to an optical axis of the fisheye lens in the coding target picture to a pixel corresponding to an outer edge of a photographing range.

4. The information processing device according to claim 3, wherein the processor is configured to:
    set the reference point in the given region within the respective first blocks.

5. The information processing device according to claim 1, wherein the processor is configured to:
    set the code amount control information such that the higher the ratio for the respective first blocks, the smaller a quantization scale set for the respective first blocks.

6. A moving image coding method comprising:
    calculating, by a computer, for each of first blocks which are obtained by dividing a coding target picture included in moving image data, a ratio of an area of respective corrected blocks which is obtained by correcting distortion of a subject represented in the respective first blocks to an area of the respective first blocks;
    generating code amount control information to control a code amount of each of the respective first blocks such that the higher the ratio for the respective first blocks and the higher a data amount of the corrected block, the larger a code amount which is assigned to the respective first blocks;
    dividing the coding target picture into second blocks,
    generating a prediction block for each of the second blocks,
    calculating a prediction error signal between the respective second blocks and the corresponding prediction block,
    calculating a orthogonal transform coefficient for each of the second blocks by performing an orthogonal transform of the corresponding prediction error signal,
    quantizing the orthogonal transform coefficient by a quantization scale in accordance with the code amount control information of the respective first blocks including the respective second blocks, and
    generating a coded data stream by entropy-coding the orthogonal transform coefficient which is quantized for each of the second blocks.

7. The moving image coding method according to claim 6, wherein the moving image data is generated by photographing using a fisheye lens.

8. The moving image coding method according to claim 7, further comprising:
    obtaining the corrected block by projecting the respective first blocks onto a plane tangent to an imaginary spherical surface at a point on the imaginary spherical surface, the point corresponding to a reference point within a given region including the respective first blocks, the imaginary spherical surface having, as a radius, a distance from a pixel corresponding to an optical axis of the fisheye lens in the coding target picture to a pixel corresponding to an outer edge of a photographing range.

9. The moving image coding method according to claim 8, further comprising:
    setting the reference point in the given region within the respective first blocks.

10. The moving image coding method according to claim 6, further comprising:

setting the code amount control information such that the higher the ratio for the first block, the smaller a quantization scale set for the respective first blocks.

11. A non-transitory computer-readable recording medium recording a moving image coding program which causes a computer to perform a process, the process comprising:

calculating for each of first blocks which are obtained by dividing a coding target picture included in moving image data, a ratio of an area of a corrected block obtained by correcting distortion of a subject represented in the first block to an area of the first block;

generating code amount control information to control a code amount of each of the respective first blocks such that the higher the ratio for the respective first blocks and the higher a data amount of the corrected block, the larger a code amount which is assigned to the respective first blocks;

dividing the coding target picture into second blocks, generating a prediction block for each of the second blocks, calculating a prediction error signal between the respective second blocks and the corresponding prediction block, calculating a orthogonal transform coefficient for each of the second blocks by performing an orthogonal transform of the corresponding prediction error signal, quantizing the orthogonal transform coefficient by a quantization scale in accordance with the code amount control information of the respective first blocks including the respective second blocks, and generating a coded data stream by entropy-coding the orthogonal transform coefficient which is quantized for each of the second blocks.

12. The non-transitory computer-readable recording medium according to claim 11, wherein the moving image data is generated by photographing using a fisheye lens.

13. The non-transitory computer-readable recording medium according to claim 12, further comprising:

obtaining the corrected block by projecting the respective first blocks onto a plane tangent to an imaginary spherical surface at a point on the imaginary spherical surface, the point corresponding to a reference point within a given region including the respective first blocks, the imaginary spherical surface having, as a radius, a distance from a pixel corresponding to an optical axis of the fisheye lens in the coding target picture to a pixel corresponding to an outer edge of a photographing range.

14. The non-transitory computer-readable recording medium according to claim 13, further comprising:

setting the reference point in the given region within the respective first blocks.

15. The non-transitory computer-readable recording medium according to claim 11, further comprising:

setting the code amount control information such that the higher the ratio for the first block, the smaller a quantization scale set for the respective first blocks.

* * * * *